(12) United States Patent
Nishiyama et al.

(10) Patent No.: US 8,810,969 B2
(45) Date of Patent: Aug. 19, 2014

(54) SUSPENSION SUBSTRATE, SUSPENSION, SUSPENSION WITH HEAD, HARD DISK DRIVE, AND METHOD OF MANUFACTURING SUSPENSION SUBSTRATE

(75) Inventors: Jin Nishiyama, Niiza (JP); Yuji Narita, Asaka (JP); Hiroki Furushou, Saitama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/880,410

(22) PCT Filed: Nov. 2, 2011

(86) PCT No.: PCT/JP2011/075299
§ 371 (c)(1),
(2), (4) Date: Apr. 19, 2013

(87) PCT Pub. No.: WO2012/060411
PCT Pub. Date: May 10, 2012

(65) Prior Publication Data
US 2013/0201581 A1 Aug. 8, 2013

(30) Foreign Application Priority Data
Nov. 2, 2010 (JP) .................. 2010-246526

(51) Int. Cl.
*G11B 5/48* (2006.01)
(52) U.S. Cl.
USPC ..................................... 360/245.9

(58) Field of Classification Search
CPC .......... G11B 5/48; G11B 5/486; G11B 5/127; G11B 17/02; H05K 1/00
USPC .............................. 360/245.9, 244.2; 174/255
See application file for complete search history.

(56) References Cited

U.S. PATENT DOCUMENTS 5,805,382 A    9/1998 Lee et al.
8,049,111 B2 * 11/2011 Kamei et al. .................. 174/250
(Continued)

FOREIGN PATENT DOCUMENTS

JP    10-079112 A1    3/1998
JP    10-154876 A1    6/1998
(Continued)

OTHER PUBLICATIONS

International Search Report dated Dec. 13, 2011.
Japanese Office Action (with English translation) mailed May 20, 2014 (JP Application No. 2010-246526).

*Primary Examiner* — Allen T Cao
(74) *Attorney, Agent, or Firm* — Burr & Brown, PLLC

(57) ABSTRACT

A suspension substrate includes a metal substrate, a first insulating layer provided on the metal substrate, a first wiring line layer provided on the first insulating layer, a second insulating layer provided on the first insulating layer and the first wiring line layer, and a second wiring line layer provided on the second insulating layer. When a total of a thickness of the first wiring line layer and a thickness of the second insulating layer on the first wiring line layer is T1 and a thickness of the second insulating layer at a position where a surface of the second insulating layer is flat and which is away from the first wiring line layer by a predetermined distance is T2, T1−T2<4.5 μm is satisfied.

15 Claims, 13 Drawing Sheets

(56) References Cited

U.S. PATENT DOCUMENTS

| | | | |
|---|---|---|---|
| 8,609,992 B2 * | 12/2013 | Chiyonaga et al. | 174/254 |
| 2004/0070884 A1 | 4/2004 | Someya et al. | |
| 2009/0173521 A1 * | 7/2009 | Yokai et al. | 174/251 |
| 2009/0218126 A1 | 9/2009 | Honjo et al. | |
| 2009/0316300 A1 * | 12/2009 | Kamei et al. | 360/110 |
| 2010/0051334 A1 * | 3/2010 | Ho et al. | 174/257 |
| 2010/0157482 A1 * | 6/2010 | Hirata | 360/245.8 |
| 2011/0011626 A1 * | 1/2011 | Yamauchi et al. | 174/250 |
| 2011/0297425 A1 * | 12/2011 | Nakamura et al. | 174/251 |
| 2011/0318609 A1 * | 12/2011 | Miura et al. | 428/846.2 |
| 2012/0048609 A1 * | 3/2012 | Ohnuki | 174/260 |
| 2012/0175153 A1 * | 7/2012 | Kaneko et al. | 174/251 |
| 2013/0126223 A1 * | 5/2013 | Yamauchi | 174/262 |
| 2013/0192879 A1 * | 8/2013 | Morita et al. | 174/251 |
| 2013/0229729 A1 * | 9/2013 | Yamazaki | 360/244.2 |

FOREIGN PATENT DOCUMENTS

| | | |
|---|---|---|
| JP | 10-335837 A1 | 12/1998 |
| JP | 2004-133988 A1 | 4/2004 |
| JP | 2004-135193 A1 | 4/2004 |
| JP | 2009-188379 A1 | 8/2009 |
| JP | 2009-206379 A1 | 9/2009 |
| WO | 96/42080 A1 | 12/1996 |

* cited by examiner

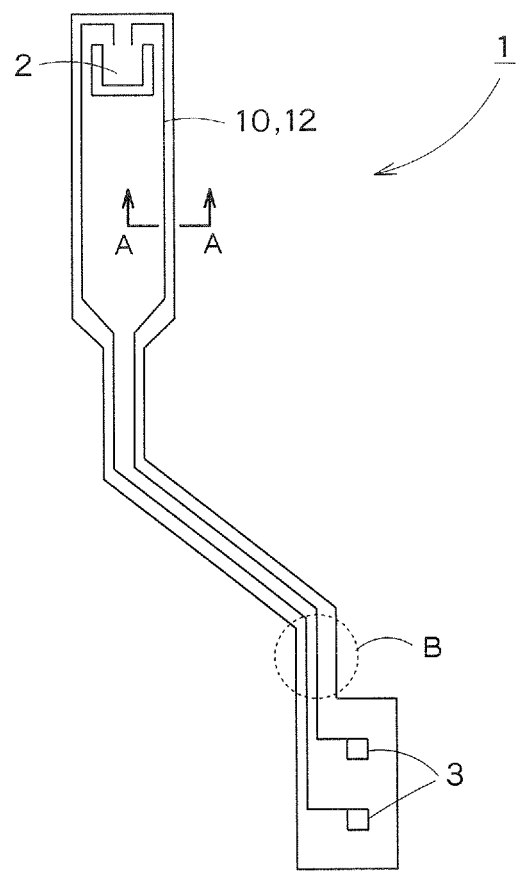
F I G. 1
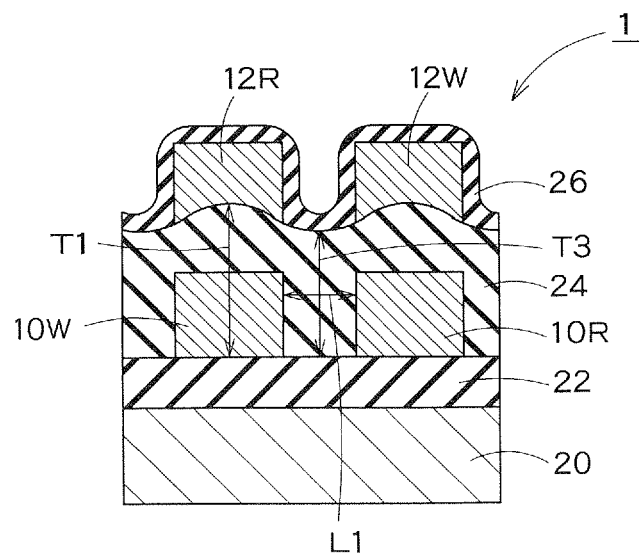
F I G. 2

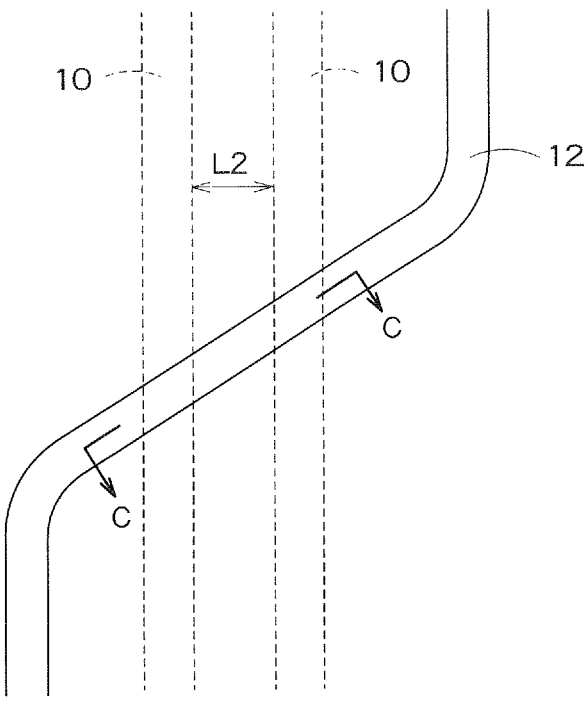
TO ELECTRODE PADS 3
F I G. 4
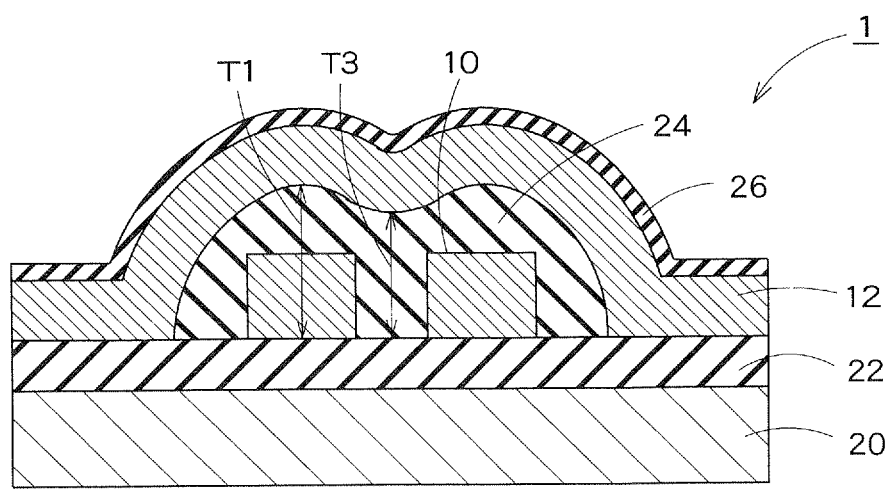
F I G. 5

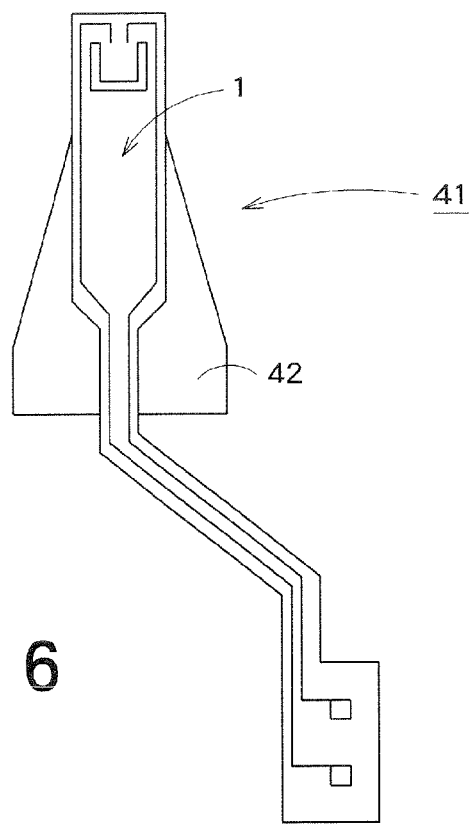
F I G. 6
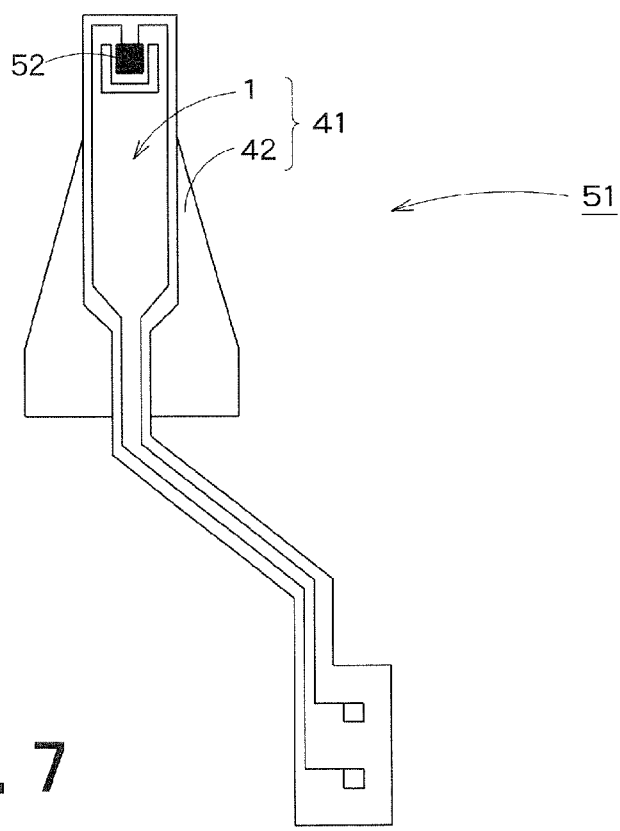
F I G. 7

(a)

(b)

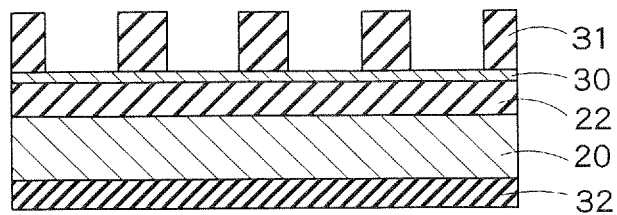
F I G. 11A
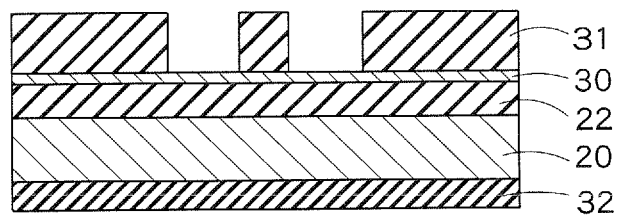
F I G. 11B
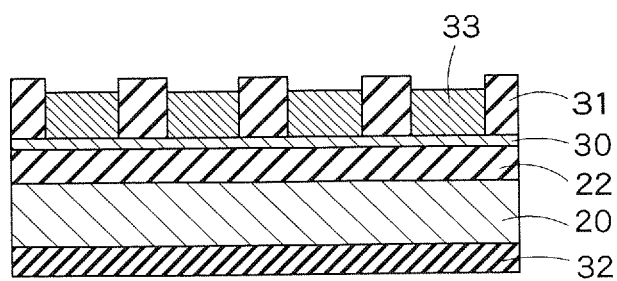
F I G. 12A
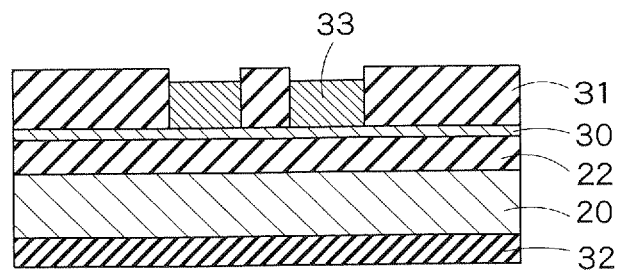
F I G. 12B

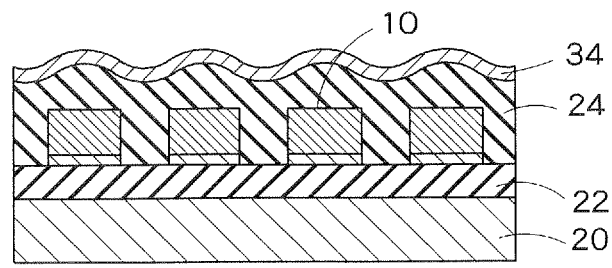
F I G. 16A
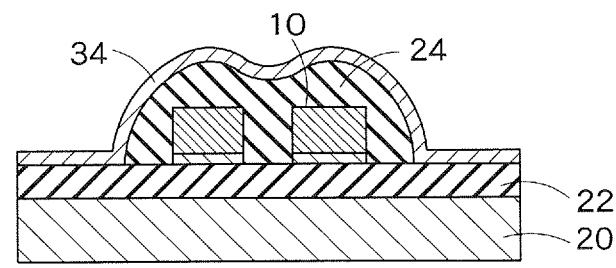
F I G. 16B
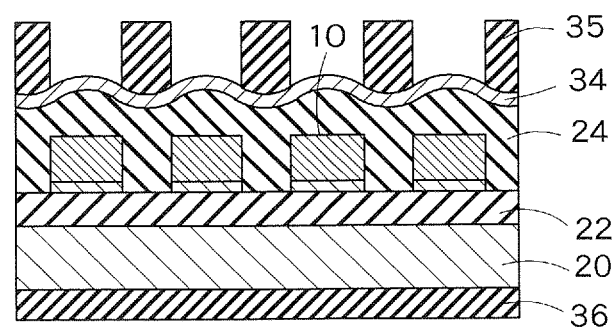
F I G. 17A
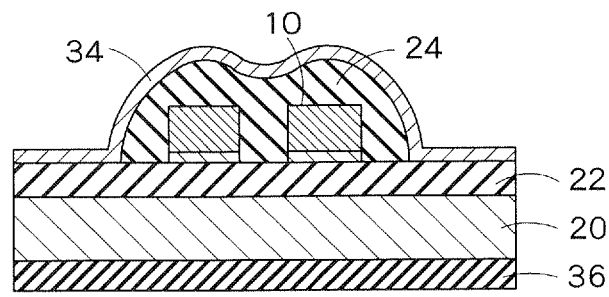
F I G. 17B

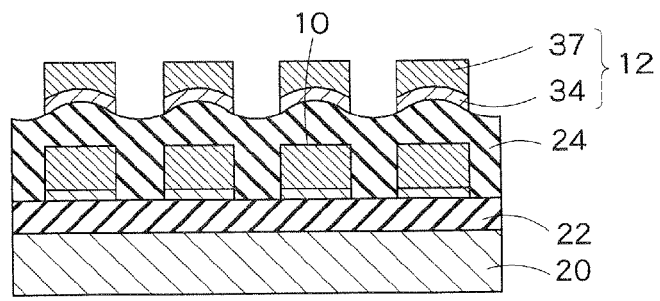
F I G. 20A
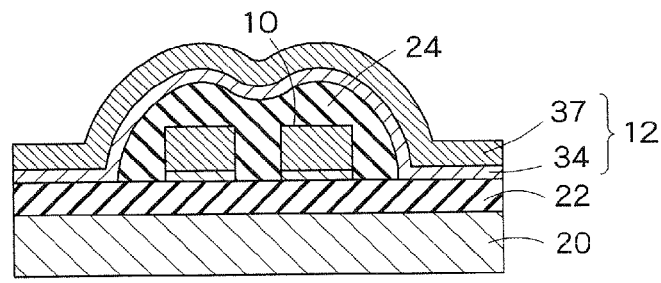
F I G. 20B
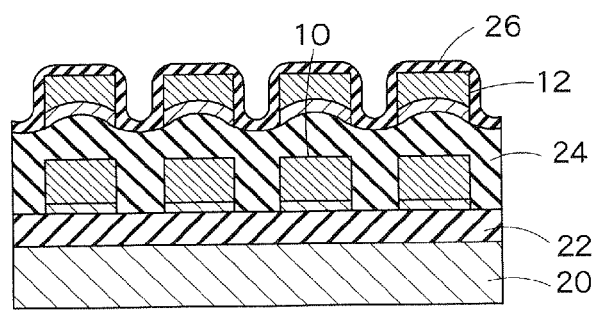
F I G. 21A
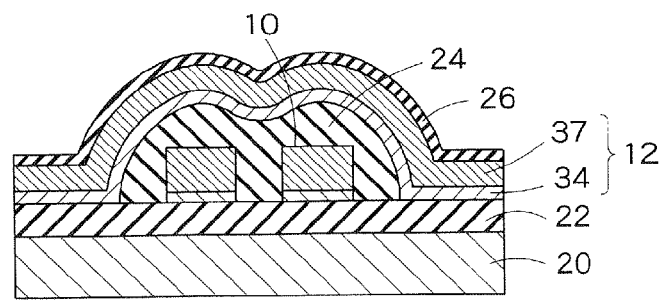
F I G. 21B

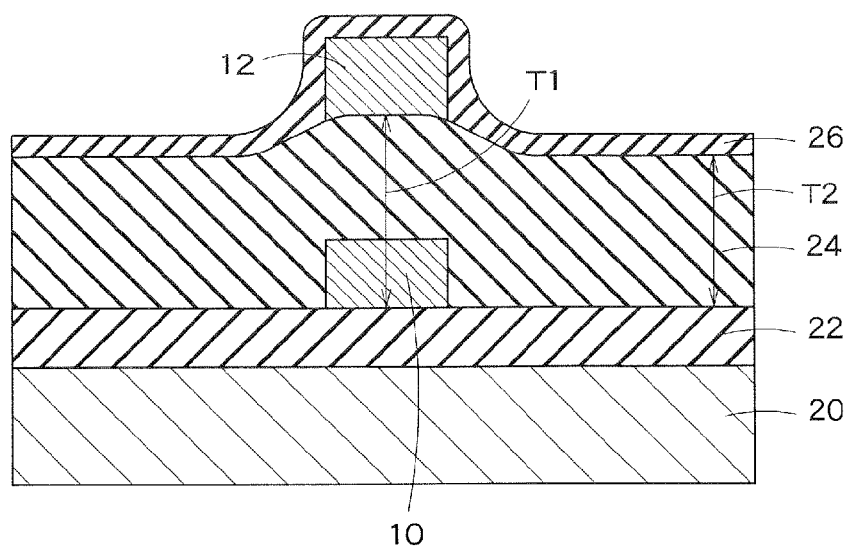
F I G. 22
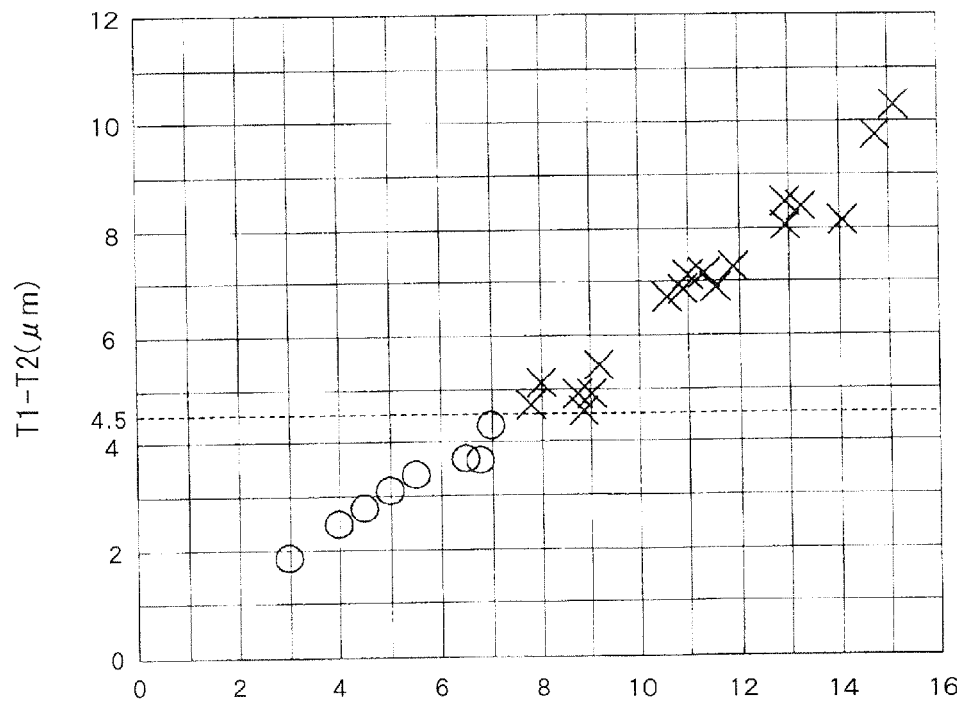
THICKNESS OF A FIRST WIRING LAYER 10($\mu$m)
F I G. 23

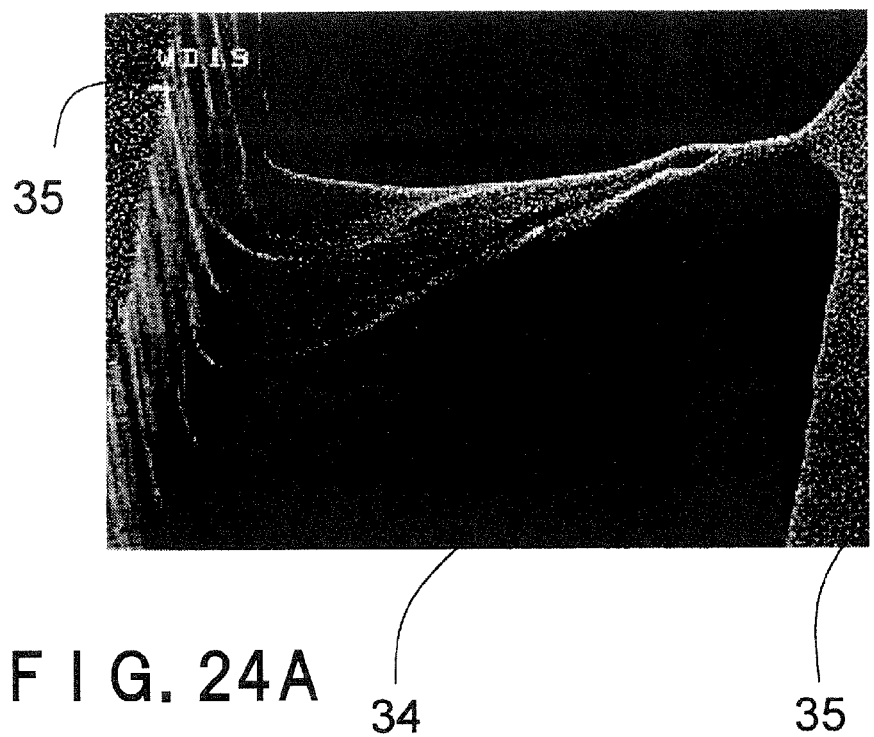
F I G. 24A
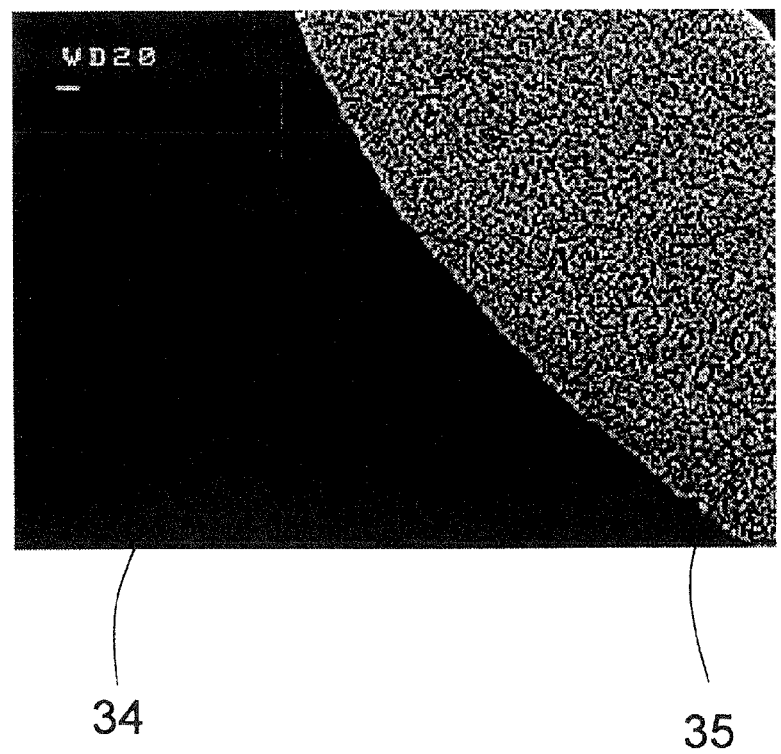
F I G. 24B

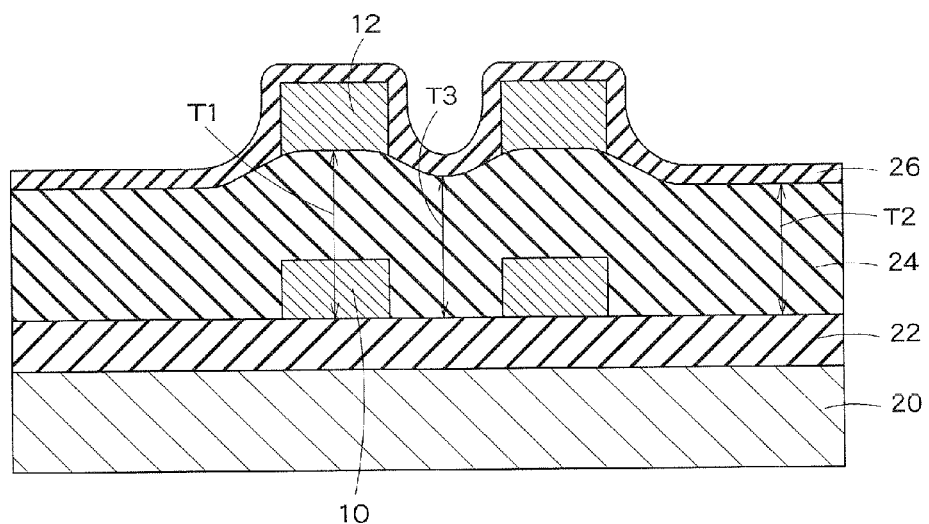
F I G. 25

SUSPENSION SUBSTRATE, SUSPENSION, SUSPENSION WITH HEAD, HARD DISK DRIVE, AND METHOD OF MANUFACTURING SUSPENSION SUBSTRATE

TECHNICAL FIELD

The present invention relates to a suspension substrate, a suspension, a suspension with a head, a hard disk drive, and a method of manufacturing a suspension substrate, and more particularly to a suspension substrate, a suspension, a suspension with a head, a hard disk drive, and a method of manufacturing a suspension substrate that achieve an improvement in flatness of a surface of an insulating layer between stacked wiring line layers.

BACKGROUND ART

In general, a hard disk drive (HDD) includes a suspension substrate having a magnetic head slider mounted thereon that writes and reads data to/from a disc that stores data. The suspension substrate has a plurality of wiring line layers, and a plurality of wiring line pads provided near a mounting region where the magnetic head slider is mounted. The wiring line pads are respectively connected to the wiring line layers. By the wiring line pads being connected to slider pads of the magnetic head slider, passing of data is performed on the magnetic head slider.

In recent years, with an increase in the capacity and information transmission rate of HDDs, there has been a demand for wiring lines of a suspension substrate to be larger in number, finer, and stacked. For example, to suppress the occurrence of crosstalk, there has been proposed a suspension substrate including a metal substrate, a first insulating layer formed on the metal substrate, a pair of first wiring line layers formed on the first insulating layer with a predetermined spacing therebetween, a second insulating layer formed to cover the first wiring line layers, and a pair of second wiring line layers formed on the second insulating layer with a predetermined spacing therebetween (see, for example, Patent Literatures 1 and 2).

However, in such a conventional suspension substrate including stacked wiring lines, the second insulating layer is formed on the first insulating layer and the first wiring line layers and thus has a shape that follows differences in level caused by the surface of the first insulating layer and the surfaces of the first wiring line layers, thereby causing irregularities on the surface of the second insulating layer. When second wiring line layers are formed on such an irregular surface of the second insulating layer, displacement of the positions of the second wiring line layers may occur or a defect in the pattern of the second wiring line layers may occur. As a result, there is a problem that the impedance of the first wiring line layers and the second wiring line layers becomes unstable.

CITATION LIST

Patent Literature

Patent Literature 1: JP 2009-188379 A
Patent Literature 2: JP 2004-133988 A

SUMMARY OF INVENTION

Technical Problem

An object of the present invention is to provide a suspension substrate, a suspension, a suspension with a head, a hard disk drive, and a method of manufacturing a suspension substrate that improve flatness of a surface of an insulating layer between stacked wiring line layers, and stabilize the impedance of the wiring line layers.

Solution to Problem

According to one aspect of the present invention, a suspension substrate comprises a metal substrate, a first insulating layer provided on the metal substrate, a first wiring line layer provided on the first insulating layer, a second insulating layer provided on the first insulating layer and the first wiring line layer, and a second wiring line layer provided on the second insulating layer. When a total of a thickness of the first wiring line layer and a thickness of the second insulating layer on the first wiring line layer is T1 and a thickness of the second insulating layer at a position where a surface of the second insulating layer is flat and which is away from the first wiring line layer by a predetermined distance is T2, $T1-T2<4.5$ μm is satisfied.

According to one aspect of the present invention, the T2 is a minimum thickness of the second insulating layer at the position where the surface of the second insulating layer is flat and which is away from the first wiring line layer by the predetermined distance.

According to one aspect of the present invention, the thickness of the first wiring line layer is between 3 and 7 μm, inclusive.

According to one aspect of the present invention, a pair of first wiring line layers are provided on the first insulating layer, and when a thickness of the second insulating layer located between the pair of first wiring line layers is T3, $T1-T3<4.5$ μm is satisfied.

According to one aspect of the present invention, wherein the second wiring line layer includes a first portion provided in a same plane as the first wiring line layer, and a second portion provided on the second insulating layer, the second portion is non-parallel to the first wiring line layer and straddles the first wiring line layer with the second insulating layer therebetween.

According to one aspect of the present invention, the second wiring line layer is parallel to the first wiring line layer and is provided above the first wiring line layer.

According to one aspect of the present invention, a suspension comprises the suspension substrate.

According to one aspect of the present invention, a suspension with a head comprises the suspension and a slider mounted on the suspension.

According to one aspect of the present invention, a hard disk drive comprises the suspension with the head.

According to one aspect of the present invention, a method of manufacturing a suspension substrate comprises forming a first insulating layer on a metal substrate, forming a plurality of first wiring line layers on the first insulating layer, forming a second insulating layer by applying a first resin material having first viscosity onto the first insulating layer and the plurality of first wiring line layers and drying the first resin material, forming a second wiring line layer on the second insulating layer, and forming a protective layer by applying a second resin material having second viscosity onto the second insulating layer and the second wiring line layer and drying the second resin material, the second viscosity being lower than the first viscosity.

According to one aspect of the present invention, in the method, when a total of a thickness of the first wiring line layer and a thickness of the second insulating layer on the first wiring line layer is T1 and a thickness of the second insulating layer at a position where a surface of the second insulating layer is flat and which is away from the first wiring line layer by a predetermined distance is T2, T1−T2<4.5 μm is satisfied.

According to one aspect of the present invention, in the method, a pair of first wiring line layers are formed, and when a thickness of the second insulating layer located between the pair of first wiring line layers is T3, T1−T3<4.5 μm is satisfied.

According to one aspect of the present invention, in the method, the second wiring line layer is formed on the first insulating layer and the second insulating layer to be non-parallel in a plane to the plurality of first wiring line layers and to straddle the plurality of first wiring line layers with the second insulating layer therebetween.

According to one aspect of the present invention, in the method, the second wiring line layer is formed parallel to the first wiring line layer and above the first wiring line layer.

According to one aspect of the present invention, in the method, the first resin material is a polyimide precursor varnish, and the first viscosity is between 2000 cP and 5000 cP, inclusive.

Advantageous Effects of Invention

According to the present invention, by forming an insulating layer between stacked wiring line layers using a material with high viscosity, flatness of a surface of the insulating layer can be improved. In addition, by improving the flatness of the surface of the insulating layer, displacement of the positions of wiring line layers on the insulating layer can be prevented and the impedance of the wiring lines can be stabilized.

BRIEF DESCRIPTION OF DRAWINGS

FIG. 1 is a plan view of a suspension substrate according to a first embodiment of the present invention.

FIG. 2 is a cross-sectional view of the suspension substrate according to the first embodiment.

FIG. 4 is a plan view of the suspension substrate according to the first embodiment.

FIG. 5 is a cross-sectional view of the suspension substrate according to the first embodiment.

FIG. 6 is a plan view showing an example of a suspension of the first embodiment.

FIG. 7 is a plan view showing an example of a suspension with a head of the first embodiment.

FIGS. 11A and 11B are process cross-sectional view continued from FIGS. 10A and 10B.

FIGS. 12A and 12B are process cross-sectional view continued from FIGS. 11A and 11B.

FIGS. 16A and 16B are process cross-sectional view continued from FIGS. 15A and 15B.

FIGS. 17A and 17B are process cross-sectional view continued from FIGS. 16A and 16B.

FIGS. 20A and 20B are process cross-sectional view continued from FIGS. 19A and 19B.

FIGS. 21A and 21B are process cross-sectional view continued from FIGS. 20A and 20B.

FIG. 22 is a cross-sectional view showing a suspension substrate according to a second embodiment of the present invention.

FIG. 23 is a graph showing a relationship between a difference in level of a second insulating layer and whether the shape of a second wiring line layer is good.

FIGS. 24A and 24B are SEM pictures of a resist pattern formed on a second insulating layer.

FIG. 25 is a cross-sectional view of a suspension substrate where the first and second embodiments of the present invention are combined.

DESCRIPTION OF EMBODIMENTS

Figure 3:
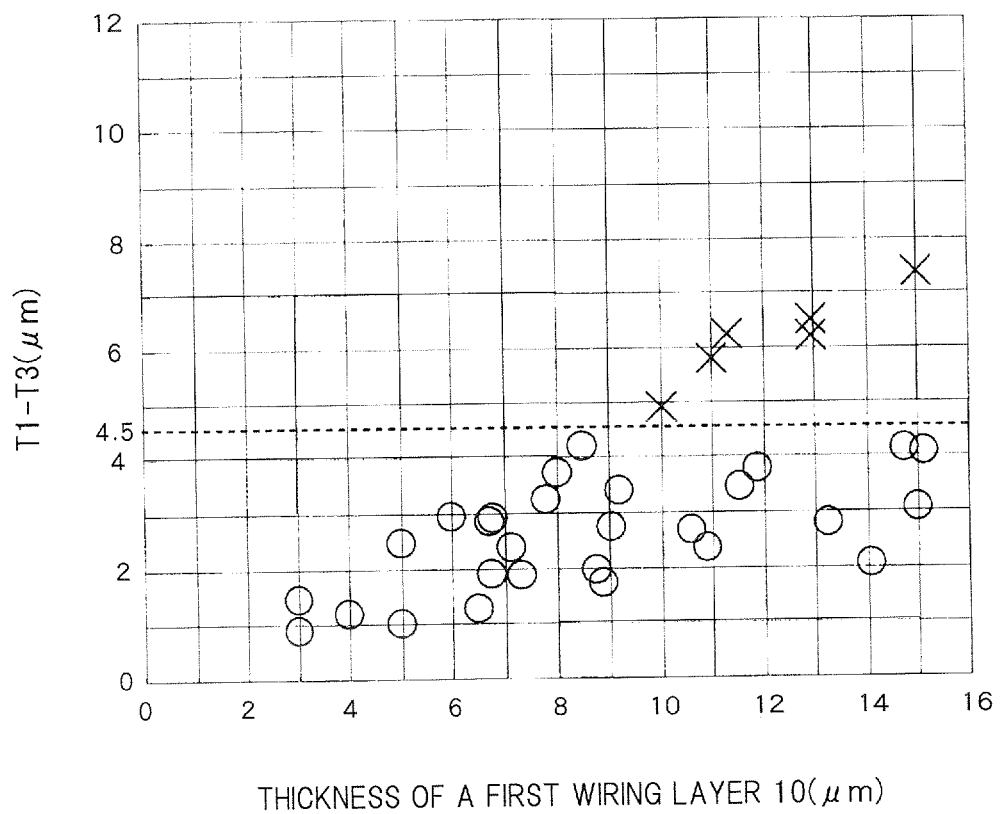
FIG. 3 is a graph showing a relationship between a difference in level of a second insulating layer and whether the shape of a second wiring line layer is good.

Embodiments of the present invention will be described below with reference to the drawings.

(First Embodiment) FIG. 1 is a plan view of a suspension substrate 1 according to a first embodiment of the present invention. As shown in FIG. 1, the suspension substrate 1 includes a mounting region 2 where a slider (not shown) is mounted as viewed from a plane, electrode pads 3, and a plurality of wiring line layers (first wiring line layers 10 and second wiring line layers 12) that connect the mounting region 2 to the electrode pads 3. FIG. 1 is a simplified plan view showing the suspension substrate 1. In FIG. 1, the plurality of wiring line layers are represented by a single line. In addition, although FIG. 1 shows two electrode pads 3, in practice, such a number of electrode pads 3 that is based on the wiring line layers are provided. The electrode pads 3 are used for connection between the suspension substrate 1 and external circuitry.

FIG. 2 shows a cross-section taken along line A-A of FIG. 1. Specifically, in an A-A cross-sectional view of FIG. 1 shown in FIG. 2, the suspension substrate 1 has a metal substrate 20, a first insulating layer 22 provided on the metal substrate 20, first wiring line layers 10 (10R and 10W) provided on the first insulating layer 22, a second insulating layer 24 provided on the first insulating layer 22 and the first wiring line layers 10, second wiring line layers 12 (12R and 12W) provided on the second insulating layer 24, and a protective layer 26 provided on the second insulating layer 24 and the second wiring line layers 12.

The plurality of first wiring line layers 10 are provided with a predetermined spacing therebetween. Likewise, the plurality of second wiring line layers 12 are provided with a predetermined spacing therebetween. FIG. 2 shows the pair of first wiring line layers 10 and the pair of second wiring line layers 12. The second wiring line layers 12 are provided above their corresponding first wiring line layers 10 and extend parallel to their corresponding first wiring line layers 10. For example, when the first wiring line layer 10R is a read wiring line, the first wiring line layer 10W is a write wiring line, the second wiring line layer 12R is a read wiring line, and the second wiring line layer 12W is a write wiring line, signals with reduced crosstalk can be transmitted.

As shown in FIG. 2, in the suspension substrate 1, when the total of the thickness of a first wiring line layer 10 and the thickness of the second insulating layer 24 on the first wiring line layer 10 is T1 and the thickness of the second insulating layer 24 located between the pair of first wiring line layers 10 is T3, T1−T3<4.5 µm is satisfied, and thus, a surface of the second insulating layer 24 is in a state of having small differences in level. For example, T1 is the total of the thickness of the first wiring line layer 10 and the maximum thickness of the second insulating layer 24 on the first wiring line layer 10. In addition, for example, T3 is the minimum thickness of the second insulating layer 24 located between the pair of first wiring line layers 10.

FIG. 3 shows a relationship between a difference in level (T1−T3) formed on the second insulating layer 24 and results as to whether a second wiring line layer 12 is formed in a desired shape. In FIG. 3, the symbol "O" indicates that the second wiring line layer 12 is formed in the desired shape, i.e., has a normal pattern, and the symbol "X" indicates that the second wiring line layer has not been able to be formed in the desired shape, i.e., has a defective pattern. A horizontal axis of a graph of FIG. 3 represents the thickness of the first wiring line layer 10. As can be seen from FIG. 3, the second wiring line layer 12 can be formed in the desired shape as long as T1−T3 is less than 4.5 µm.

By thus setting T1 and T3 in the above-described manner to reduce differences in level on the surface of the second insulating layer 24, displacement of the formation positions of the second wiring line layers 12 does not occur and thus the second wiring line layers 12 can be provided at desired positions above the first wiring line layers 10 and in a desired shape. Therefore, the second wiring line layers 12 can be stably formed and thus a desired wiring line impedance is obtained.

In FIG. 2, a distance L1 between the pair of first wiring line layers 10 is, for example, between 5 µm and 100 µm, inclusive. The first wiring line layers 10 may have any thickness as long as the thickness allows signals to be sufficiently transmitted. The thickness is, for example, between 3 µm and 12 µm, inclusive, and more preferably between 3 µm and 7 µm, inclusive. The width of the first wiring line layers 10 and the second wiring line layers 12 is, for example, between 5 µm and 100 µm, inclusive. The second insulating layer 24 on the first wiring line layer 10 may have any thickness as long as the thickness allows to control the impedance of the first wiring line layers 10 and the second wiring line layers 12. The thickness is, for example, between 3 µm and 15 µm inclusive.

FIG. 4 is a plan view showing wiring line layers (the first wiring line layers 10 and the second wiring line layer 12) in a region B of FIG. 1. As shown in FIG. 4, in the region B, the second wiring line layer 12 is provided to straddle the pair of first wiring line layers 10 so as to be non-parallel in a plane to the pair of first wiring line layers 10.

FIG. 5 shows a cross-section taken along line C-C of FIG. 4. The suspension substrate 1 has a metal substrate 20, a first insulating layer 22 provided on the metal substrate 20, first wiring line layers 10 provided on the first insulating layer 22, a second insulating layer 24 provided on the first insulating layer 22 and the first wiring line layers 10, a second wiring line layer 12 provided on the second insulating layer 24, and a protective layer 26 provided to cover the second wiring line layer 12.

The second wiring line layer 12 is provided to straddle the pair of first wiring line layers 10 with the second insulating layer 24 therebetween. The second wiring line layer 12 includes a portion provided on the first insulating layer 22 (in the same plane as the first wiring line layers 10) and a portion provided on the second insulating layer 24 to straddle the first wiring line layers 10.

As described above, in the suspension substrate 1, when the total of the thickness of the first wiring line layer 10 and the thickness of the second insulating layer 24 on the first wiring line layer 10 is T1 and the thickness of the second insulating layer 24 located between the pair of first wiring line layers 10 is T3, T1−T3<4.5 µm is satisfied, and thus, the top surface of the second insulating layer 24 is in a state of having small differences in level. A relationship between a difference in level (T1−T3) formed on the second insulating layer 24 and results as to whether the second wiring line layer 12 straddling the first wiring line layers 10 is formed in a desired shape is the same as that in FIG. 3. Specifically, the second wiring line layer 12 straddling the first wiring line layers 10 can be formed in the desired shape as long as T1−T3 is less than 4.5 µm.

Therefore, differences in level and irregularities on the top surface of the second insulating layer 24 can be reduced and thus the second wiring line layer 12 straddling the first wiring line layers 10 is stably formed, enabling to improve the reliability of the second wiring line layer 12. By this, the arrangement of a wiring line pattern can be stably changed without breaking lines, enabling to improve flexibility in the routing of wiring lines.

In FIG. 4, a distance L2 between the pair of first wiring line layers 10 is, for example, between 5 µm and 100 µm, inclusive. The first wiring line layers 10 shown in FIG. 5 may have any thickness as long as the thickness allows signals to be sufficiently transmitted. The thickness is, for example, between 3 µm and 12 µm, inclusive, and more preferably between 3 µm and 7 µm, inclusive. The width of the first wiring line layers 10 and the second wiring line layer 12 is, for example, between 5 µm and 100 µm, inclusive. The second insulating layer 24 on a first wiring line layer 10 may have any thickness as long as the thickness allows to control the impedance of the first wiring line layers 10 and the second wiring line layer 12. The thickness is, for example, between 3 µm and 15 µm, inclusive.

Next, the constituent members of the suspension substrate 1 will be described.

Each electrode pad 3 has, for example, a nickel (Ni) plating layer formed on wiring line layers 10 and 12, and a gold (Au) plating layer formed on the Ni plating layer.

The material of the metal substrate 20 is not particularly limited as long as the material has a desired conductivity, elasticity, and strength. For example, stainless, aluminum, beryllium copper, or other copper alloys can be used. It is preferable to use stainless.

The material of the first wiring line layers 10 and the second wiring line layers 12 is not particularly limited as long as the material has a desired conductivity, but it is preferable to use copper (Cu). Any other material than copper can also be used as long as the material has electrical characteristics equivalent to those of pure copper.

The material of the first insulating layer 22 and the second insulating layer 24 is not particularly limited as long as the material has desired insulation properties, but it is preferable to use polyimide (PI).

For the material of the protective layer 26, it is preferable to use a resin material, e.g., polyimide (PI). Incidentally, for the material of the protective layer 26, both photosensitive and non-photosensitive materials can be used.

Next, a suspension 41 of the present embodiment will be described using FIG. 6. The suspension 41 shown in FIG. 6 has the aforementioned suspension substrate 1, and a load beam 42 provided on a surface (lower surface) of the suspension substrate 1 which is on the opposite side of a mounting region 2, to hold a slider 52 which will be described later (see FIG. 7) against a disc 63 (see FIG. 8).

Next, a suspension with a head 51 of the present embodiment will be described using FIG. 7. The suspension with the head 51 shown in FIG. 7 has the aforementioned suspension 41, and a slider 52 mounted in a mounting region 2 of a suspension substrate 1 and provided with a plurality of slider pads on the back side thereof.

Next, a hard disk drive 61 of the present embodiment will be described using FIG. 8. The hard disk drive 61 shown in FIG. 8 has a case 62, a disc 63 rotatably mounted on the case 62 to store data, a spindle motor 64 that rotates the disc 63, and the suspension with the head 51 provided to be close to the disc 63 so as to maintain a desired flying height and including a slider 52 that writes and reads data to/from the disc 63. Of them, the suspension with the head 51 is movably mounted on the case 62. A voice coil motor 65 that allows the slider 52 of the suspension with the head 51 to move along the disc 63 is mounted on the case 62. In addition, an arm 66 is connected between the suspension with the head 51 and the voice coil motor 65.

Next, a method of manufacturing the suspension substrate 1 according to the present embodiment will be described using process cross-sectional views shown in FIGS. 9A and 9B to 21A and 21B. FIGS. 9A-21A show a cross-section corresponding to FIG. 2. FIGS. 9B-21B show a cross-section corresponding to FIG. 5.

Figure 9A:
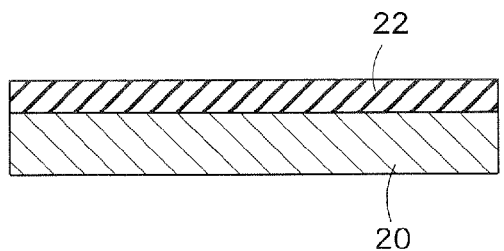
FIGS. 9A and 9B are process cross-sectional view describing a method of manufacturing a suspension substrate according to the first embodiment.
Figure 9B:
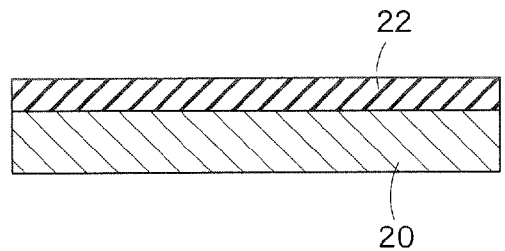

First, as shown in FIGS. 9A and 9B, a metal substrate 20 having polyimide stacked thereon that serves as a first insulating layer 22 is prepared.

Figure 10A:
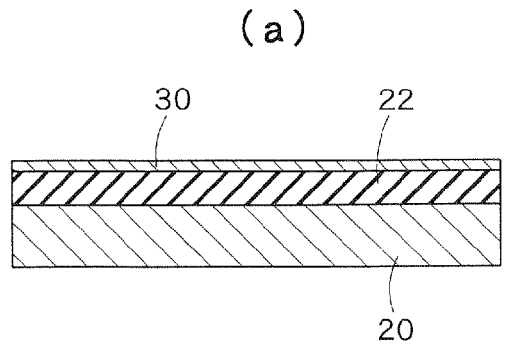
FIGS. 10A and 10B are process cross-sectional view continued from FIGS. 9A and 9B.
Figure 10B:
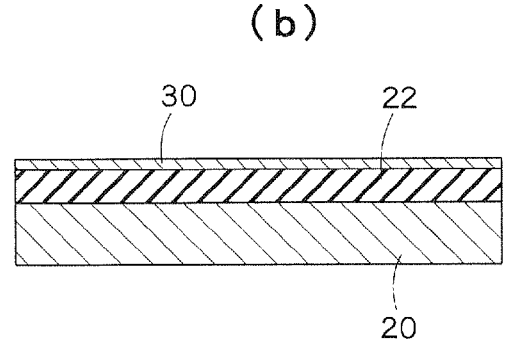

Then, as shown in FIGS. 10A and 10B, a sputtered layer 30 of chromium (Cr) and copper (Cu) is formed on the first insulating layer 22.

Then, as shown in FIGS. 11A and 11B, resists 31 and 32 are formed on the top surface of the sputtered layer 30 and the undersurface of the metal substrate 20. Then, using a photolithographic method, the resist 31 is patterned into a pattern for first wiring line layers 10.

Then, as shown in FIGS. 12A and 12B, metal films 33 formed of copper are formed in openings of the resist 31 by an electrolytic copper plating method.

Figure 13A:
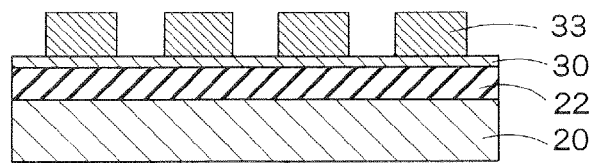
FIGS. 13A and 13B are process cross-sectional view continued from FIGS. 12A and 12B.
Figure 13B:
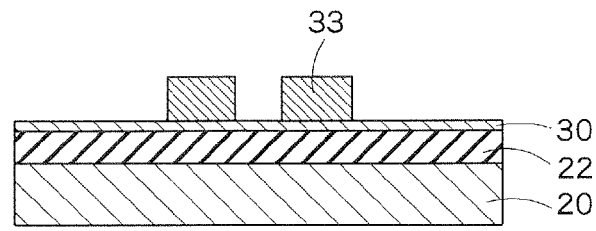

Then, as shown in FIGS. 13A and 13B, the resists 31 and 32 are removed.

Figure 14A:
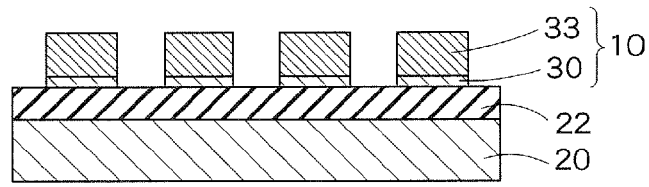
FIGS. 14A and 14B are process cross-sectional view continued from FIGS. 13A and 13B.
Figure 14B:
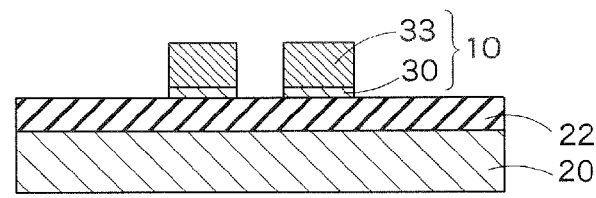

Then, as shown in FIGS. 14A and 14B, surface-exposed portions of the sputtered layer 30 are removed. By this, first wiring line layers 10 each having a sputtered layer 30 and a metal film 33 are formed. Although FIG. 2 shows a pair of wiring line layers 10, here, more wiring line layers 10 are formed.

Figure 15A:
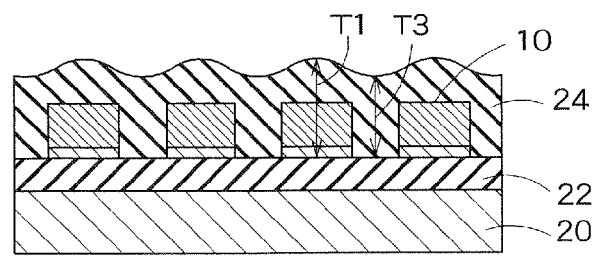
FIGS. 15A and 15B are process cross-sectional view continued from FIGS. 14A and 14B.
Figure 15B:
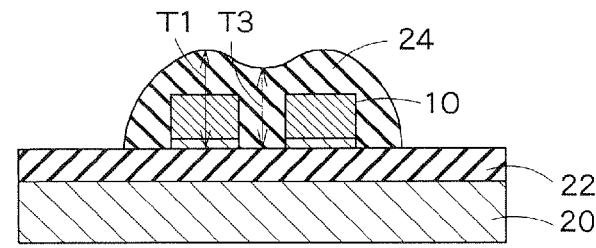

Then, as shown in FIGS. 15A and 15B, a resin material for forming an insulating layer is applied onto the first insulating layer 22 and the first wiring line layers 10 to cover the first wiring line layers 10. The resin material is a polyimide precursor varnish. Then, the polyimide precursor varnish is dried by heat, thereby forming a second insulating layer 24.

Note that the polyimide precursor varnish applied here preferably has high viscosity. For example, the polyimide precursor varnish has a viscosity of between 500 cP (centipoise) and 5000 cP, inclusive, and more preferably between 2000 cP and 5000 cP, inclusive. When the viscosity is less than 2000 cP, coating unevenness is likely to occur after application, which makes it difficult to obtain a desired film thickness. On the other hand, when the viscosity is greater than 5000 cP, the amount of discharge of an apparatus that applies a resin material becomes non-uniform and thus application becomes difficult. Hence, the viscosity of a resin material that forms the second insulating layer 24 is preferably between 2000 cP and 5000 cP, inclusive.

The polyimide precursor varnish is applied onto differences in level caused by the surface of the first insulating layer 22 and the surfaces of the first wiring line layers 10. However, since the polyimide precursor varnish applied in this process has high viscosity, the polyimide precursor varnish results in a shape that does not much follow the differences in level. This enables to form the second insulating layer 24 with small differences in surface level such as T1−T3<4.5 μm when the total of the thickness of a first wiring line layer 10 and the thickness of the second insulating layer 24 on the first wiring line layer 10 is T1 and the thickness of the second insulating layer 24 located between first wiring line layers 10 is T3.

Then, as shown in FIGS. 16A and 16B, a sputtered layer 34 of chromium (Cr) and copper (Cu) is formed on the second insulating layer 24.

Then, as shown in FIGS. 17A and 17B, resists 35 and 36 are formed on the top surface of the sputtered layer 34 and the undersurface of the metal substrate 20. Then, using a photolithographic method, the resist 35 is patterned into a pattern for second wiring line layers 12. In FIG. 17A, the resist 35 is patterned such that openings parallel to the first wiring line layers are formed above the first wiring line layers 10. In FIG. 17B, the resist 35 is patterned so as to form openings intersecting (non-parallel to) the first wiring line layers 10 in a plane.

Since the resist 35 is formed on the second insulating layer 24 with small differences in surface level, patterning is easy and openings can be formed at desired positions.

Figure 18A:
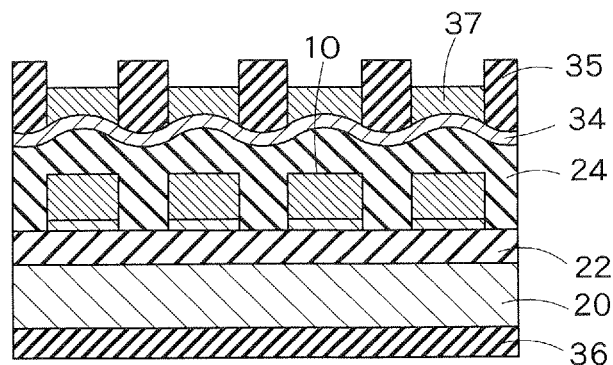
FIGS. 18A and 18B are process cross-sectional view continued from FIGS. 17A and 17B.
Figure 18B:
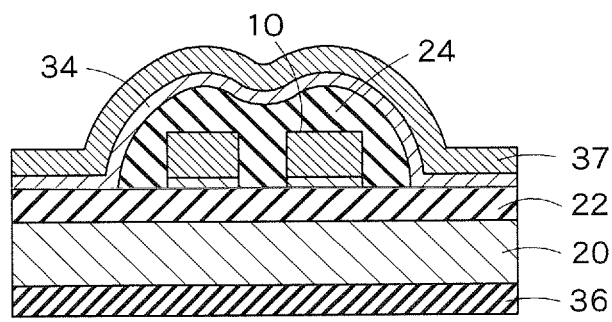

Then, as shown in FIGS. 18A and 18B, metal films 37 formed of copper are formed in the openings of the resist 35 by an electrolytic copper plating method.

Figure 19A:
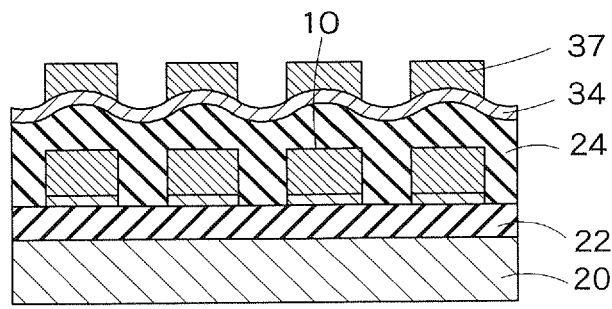
FIGS. 19A and 19B are process cross-sectional view continued from FIGS. 18A and 18B.
Figure 19B:
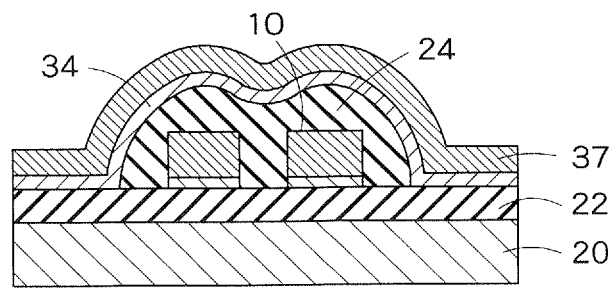

Then, as shown in FIGS. 19A and 19B, the resists 35 and 36 are removed.

Then, as shown in FIGS. 20A and 20B, surface-exposed portions of the sputtered layer 34 are removed. Accordingly, second wiring line layers 12 each having a sputtered layer 34 and a metal film 37 are formed.

Then, as shown in FIGS. 21A and 21B, a resin material for forming a protective layer is applied onto the second insulating layer 24 and the second wiring line layers 12 to cover the second wiring line layers 12. The resin material is a polyimide precursor varnish. Then, the polyimide precursor varnish is dried by heat, thereby forming a protective layer 26.

Note that the polyimide precursor varnish applied here has lower viscosity than the polyimide precursor varnish applied in the process shown in FIGS. 14A and 14B. Hence, as shown in FIG. 21A, the protective layer 26 results in a shape that follows differences in level caused by the surface of the second insulating layer 24 and the surfaces of the second wiring line layers 12.

Though subsequent processes are not shown, the ends of the first wiring line layers 10 and the second wiring line layers 12 are exposed and Ni plating and Au plating are performed, thereby forming electrode pads 3 used for connection with external circuitry, and wiring line pads used for connection with slider pads which are provided on a slider 52 in a mounting region 2. Thereafter, a patterned resist is formed on the undersurface of the metal substrate 20, and the metal substrate 20 is etched using an etchant, such as a ferric chloride solution, from openings of the resist to remove the resist, thereby obtaining a suspension substrate 1 of the present embodiment.

A load beam 42 is mounted on the undersurface of the suspension substrate 1 thus obtained, thereby obtaining a suspension 41 shown in FIG. 6. A slider 52 provided with a plurality of slider pads on the back side thereof is mounted in a mounting region 2 of the suspension 41, thereby obtaining a suspension with a head 51 shown in FIG. 7. In this case, the slider pads of the slider 52 are connected to the wiring line pads provided at the ends of the wiring line layers 10 and 12. Furthermore, the suspension with the head 51 is mounted on a case 62 of a hard disk drive 61, thereby obtaining a hard disk drive 61 shown in FIG. 8.

Figure 8:
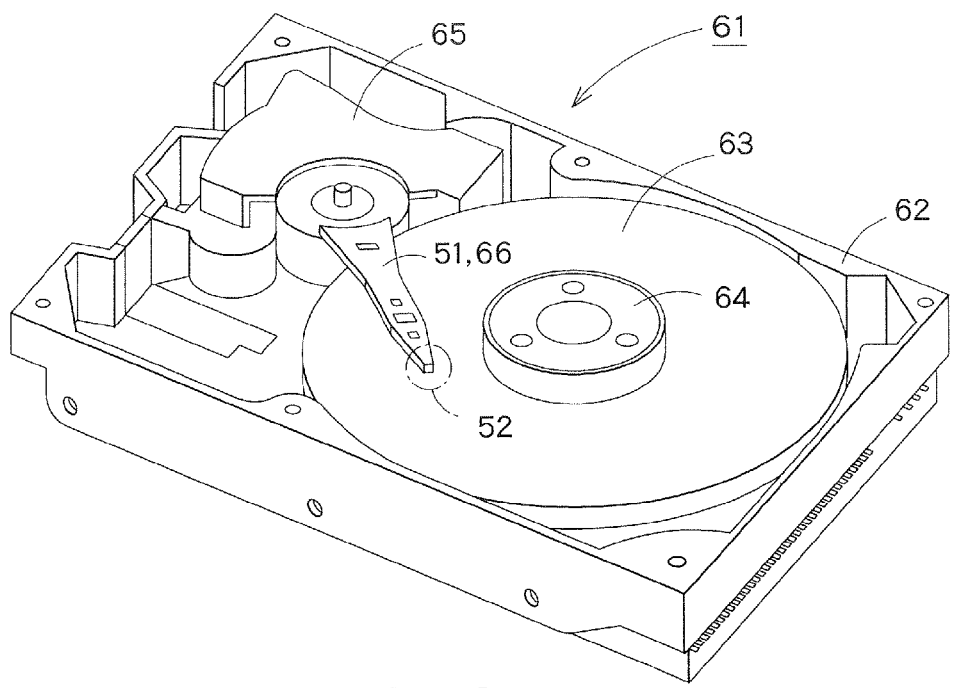
FIG. 8 is a plan view showing an example of a hard disk drive of the first embodiment.

When reading and writing of data are performed on the hard disk drive 61 shown in FIG. 8, the slider 52 of the suspension with the head 51 is allowed to move along the disc 63 by the voice coil motor 65, and comes close to the disc 63 being rotated by the spindle motor 64, with a desired flying height being maintained. By this, passing of data is performed between the slider 52 and the disc 63 through the slider pads and the wiring line pads. During this period, electrical signals are transmitted through the wiring line layers 10 and 12 which are connected between the wiring line pads in the mounting region 2 of the suspension substrate 1 and the electrode pads 3.

As such, according to the first embodiment, the second insulating layer 24 of the suspension substrate 1 is formed using a material with high viscosity to improve flatness of a surface of the second insulating layer 24. On the second insulating layer 24 with small differences in surface level, the resist 35 can be easily patterned, enabling to prevent displacement of the positions of the second wiring line layers 12. Hence, the second wiring line layers 12 can be stably formed on the second insulating layer 24 and thus a desired wiring line impedance is obtained. In addition, a second wiring line layer 12 straddling first wiring line layers 10, such as that shown in FIG. 4, can be easily formed.

(Second Embodiment) FIG. 22 shows a cross section of a suspension substrate according to a second embodiment of the present invention. The cross-section shown in FIG. 22 is a cross-section taken along line A-A of FIG. 1. In FIG. 22, the same portions as those of the first embodiment shown in FIG. 2 are denoted by the same reference numerals and description thereof is omitted.

As shown in FIG. 22, a suspension substrate 1 has a metal substrate 20, a first insulating layer 22 provided on the metal substrate 20, a first wiring line layer 10 provided on the first insulating layer 22, a second insulating layer 24 provided on the first insulating layer 22 and the first wiring line layer 10, a second wiring line layer 12 provided on the second insulating layer 24, and a protective layer 26 provided on the second insulating layer 24 and the second wiring line layer 12. Two or more first wiring line layers 10 and two or more second wiring line layers 12 may be provided.

In the suspension substrate 1, when the total of the thickness of the first wiring line layer 10 and the thickness of the second insulating layer 24 on the first wiring line layer 10 is T1 and the thickness of the second insulating layer 24 at the position where a surface of the second insulating layer 24 is flat and which is away from the first wiring line layer 10 by a predetermined distance is T2, T1−T2<4.5 μm is satisfied, and thus, the surface of the second insulating layer 24 is in a state of having high flatness. The position where the surface of the second insulating layer 24 is flat is, for example, the position where the thickness of the second insulating layer 24 (the distance between the top surface of the first insulating layer 22 and the top surface of the second insulating layer 24) is minimum. In addition, for example, T1 is the total of the thickness of the first wiring line layer 10 and the maximum thickness of the second insulating layer 24 on the first wiring line layer 10.

Note that when the second insulating layer 24 has a tapered shape or gets thinner in a stepwise manner at edges in a left-right direction of FIG. 22, the thickness of the second insulating layer 24 is minimum at the edges. Hence, in such a case, it is preferred that the minimum thickness of the second insulating layer 24 in a region excluding the edges be set as T2. Alternatively, an average value of the minimum thickness of the second insulating layer 24 in a left direction of FIG. 22 as viewed from the first wiring line layer 10 and the minimum thickness of the second insulating layer 24 in a right direction may be set as T2.

FIG. 23 shows a relationship between a difference in level (T1−T2) formed on the second insulating layer 24 and results as to whether the second wiring line layer 12 is formed in a desired shape. In FIG. 23, the symbol "O" indicates that the second wiring line layer 12 is formed in the desired shape, i.e., has a normal pattern, and the symbol "X" indicates that the second wiring line layer has not been able to be formed in the desired shape, i.e., has a defective pattern. A horizontal axis of a graph of FIG. 23 represents the thickness of the first wiring line layer 10. As can be seen from FIG. 23, the second wiring line layer 12 can be formed in the desired shape as long as T1−T2 is less than 4.5 μm.

Whether the pattern shape of the second wiring line layers 12 is good or poor is ascribable to the shape of a resist pattern provided when forming the second wiring line layers 12. As described in the above-described first embodiment, second wiring line layers 12 are formed by forming a sputtered layer 34 on a second insulating layer 24 (FIGS. 16A and 16B), forming a resist 35 on the sputtered layer 34 and patterning the resist 35 (FIGS. 17A and 17B), forming metal films 37 in openings of the resist 35 by an electrolytic copper plating method (FIGS. 18A and 18B), removing the resist 35 (FIGS. 19A and 19B), and removing surface-exposed portions of the sputtered layer 34 (FIGS. 20A and 20B). Furthermore, a protective layer 26 is formed on the second wiring line layers 12 (FIGS. 21A and 21B).

If differences in level (T1−T2) formed on the second insulating layer 24 are large, then when the resist 35 is patterned, openings cannot be accurately formed. FIG. 24A shows a SEM picture of an opening of a resist 35 when the thickness of the first wiring line layer 10 is 13.5 μm and T1−T2 is 8.3 μm. As can be seen from FIG. 24A, when a difference in level (T1−T2) formed on the second insulating layer 24 is large, the resist 35 remains in the opening where a sputtered layer 34 is exposed. This occurs because incident light that cures the resist 35 is scattered by the difference in level on the surface of the second insulating layer 24. When a metal film 37 is formed on the sputtered layer 34 with the resist 35 remaining in the opening, a defect in the shape of the second wiring line layer 12 occurs.

However, if differences in level (T1−T2) formed on the second insulating layer 24 are less than 4.5 μm to increase the surface flatness of the second insulating layer 24, then when the resist 35 is patterned, openings can be accurately formed. FIG. 24B shows a SEM picture of an opening of a resist 35 when the thickness of the first wiring line layer 10 is 6.8 μm and T1−T2 is 3.8 μm. As can be seen from FIG. 24B, the opening of the resist 35 is accurately formed. When a metal film 37 is formed on a sputtered layer 34 exposed by such an opening, a second wiring line layer 12 having a desired shape is obtained.

The suspension substrate according to the present embodiment can be manufactured by a similar method to that of the above-described first embodiment. By setting the viscosity of a polyimide precursor varnish used to form a second insulating layer 24 to between 500 cP and 5000 cP, inclusive, and more preferably between 2000 cP and 5000 cP, inclusive, a second insulating layer 24 can be formed that has high surface flatness such as T1−T2<4.5 μm when the total of the thickness of the first wiring line layer 10 and the thickness of the second insulating layer 24 on the first wiring line layer 10 is T1 and the thickness of the second insulating layer 24 at the position where a surface thereof is flat and which is away from the first wiring line layer 10 by a predetermined distance is T2.

Note that, as can be seen from FIG. 23, T1−T2 is influenced by the thickness of the first wiring line layer 10. To set T1−T2<4.5 μm, it is preferred that the thickness of the first wiring line layer 10 be 7 μm or less. In addition, in order that signals can be sufficiently transmitted, it is preferred that the thickness of the first wiring line layer 10 be 3 μm or more.

As such, according to the second embodiment, the second insulating layer 24 of the suspension substrate 1 is formed using a material with high viscosity to improve flatness of a surface of the second insulating layer 24. On the second insulating layer 24 with high surface flatness, the resist 35 can be easily patterned, enabling to form a second wiring line layer 12 having a desired shape. Hence, the second wiring line layer 12 can be stably formed on the second insulating layer 24 and thus a desired wiring line impedance is obtained.

The above-described first and second embodiments may be combined. Specifically, as shown in FIG. 25, when the total of the thickness of a first wiring line layer 10 and the thickness of a second insulating layer 24 on the first wiring line layer 10 is T1, the thickness of the second insulating layer 24 located between a pair of first wiring line layers 10 is T3, and the thickness of the second insulating layer 24 at the position where a surface of the second insulating layer 24 is flat and which is away from a first wiring line layer 10 by a predetermined distance is T2, T−T3<4.5 μm and T1−T2<4.5 μm are satisfied. By such a configuration, second wiring line layers 12 can be further stably formed on the second insulating layer 24 and thus a desired wiring line impedance is obtained.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

1: SUSPENSION SUBSTRATE
2: MOUNTING REGION
3: ELECTRODE PAD
10: FIRST WIRING LINE LAYER
12: SECOND WIRING LINE LAYER
20: METAL SUBSTRATE
22: FIRST INSULATING LAYER
24: SECOND INSULATING LAYER
26: PROTECTIVE LAYER
30: SPUTTERED LAYER
31,32: RESIST
33: METAL FILM
34: SPUTTERED LAYER
35,36: RESIST
37: METAL FILM
41: SUSPENSION
42: LOAD BEAM
51: SUSPENSION WITH A HEAD
52: SLIDER
61: HARD DISK DRIVE
62: CASE
63: DISC
64: SPINDLE MOTOR
65: VOICE COIL MOTOR
66: ARM

The invention claimed is:

1. A suspension substrate comprising:
a metal substrate;
a first insulating layer provided on the metal substrate;
a first wiring line layer provided on the first insulating layer;
a second insulating layer provided on the first insulating layer and the first wiring line layer; and
a second wiring line layer provided on the second insulating layer, wherein
when a total of a thickness of the first wiring line layer and a thickness of the second insulating layer on the first wiring line layer is T1 and a thickness of the second insulating layer at a position where a surface of the second insulating layer is flat and which is away from the first wiring line layer by a predetermined distance is T2, T1−T2 <4.5 μm is satisfied.

2. The suspension substrate according to claim 1, wherein the T2 is a minimum thickness of the second insulating layer at the position where the surface of the second insulating layer is flat and which is away from the first wiring line layer by the predetermined distance.

3. The suspension substrate according to claim 1, wherein the thickness of the first wiring line layer is between 3 μm and 7 μm, inclusive.

4. The suspension substrate according to claim 1, wherein
a pair of first wiring line layers are provided on the first insulating layer, and
when a thickness of the second insulating layer located between the pair of first wiring line layers is T3, T1−T3 <4.5 μm is satisfied.

5. The suspension substrate according to claim 1, wherein the second wiring line layer includes a first portion provided in a same plane as the first wiring line layer, and a second portion provided on the second insulating layer, the second portion is non-parallel to the first wiring line layer and straddles the first wiring line layer with the second insulating layer therebetween.

6. The suspension substrate according to claim 1, wherein the second wiring line layer is parallel to the first wiring line layer and is provided above the first wiring line layer.

7. A suspension comprising a suspension substrate according to claim 1.

8. A suspension with a head comprising:
the suspension according to claim 7; and
a slider mounted on the suspension.

9. A hard disk drive comprising the suspension with the head according to claim 8.

10. A method of manufacturing a suspension substrate comprising:
forming a first insulating layer on a metal substrate;
forming a plurality of first wiring line layers on the first insulating layer;

forming a second insulating layer by applying a first resin material having first viscosity onto the first insulating layer and the plurality of first wiring line layers and drying the first resin material;

forming a second wiring line layer on the second insulating layer; and forming a protective layer by applying a second resin material having second. viscosity onto the second insulating layer and the second wiring line layer and drying the second resin material, the second viscosity being lower than the first viscosity.

11. The method of manufacturing a suspension substrate according to claim 10, wherein when a total of a thickness of the first wiring line layer and a thickness of the second insulating layer on the first wiring line layer is T1 and a thickness of the second insulating layer at a position where a surface of the second insulating layer is flat and which is away from the first wiring line layer by a predetermined distance is T2, T1−T2 <4.5 μm is satisfied.

12. The method of manufacturing a suspension substrate according to claim 11, wherein
a pair of first wiring line layers are formed, and
when a thickness of the second insulating layer located between the pair of first wiring line layers is T3, T1−T3 <4.5 μm is satisfied.

13. The method of manufacturing a suspension substrate according to claim 10. wherein the second wiring line layer is formed on the first insulating layer and the second insulating layer to be non-parallel in a plane to the plurality of first wiring line layers and to straddle the plurality of first wiring line layers with the second insulating layer therebetween.

14. The method of manufacturing a suspension substrate according to claim 10, wherein the second wiring line layer is formed parallel to the first wiring line layer and above the first wiring line layer.

15. The method of manufacturing a suspension substrate according to claim 10, wherein the first resin material is a polyimide precursor varnish, and the first viscosity is between 2000 cP and 5000 cP, inclusive.

* * * * *